(12) United States Patent
Rajagopalan et al.

(10) Patent No.: US 6,844,384 B2
(45) Date of Patent: Jan. 18, 2005

(54) GOLF BALL COMPOSITIONS CONTAINING OXA ESTERS

(75) Inventors: Murali Rajagopalan, South Dartmouth, MA (US); Kevin Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 24 days.

(21) Appl. No.: 10/067,887

(22) Filed: Feb. 8, 2002

(65) Prior Publication Data

US 2002/0072556 A1 Jun. 13, 2002

Related U.S. Application Data

(63) Continuation of application No. 09/608,566, filed on Jun. 30, 2000, now Pat. No. 6,391,955, which is a continuation-in-part of application No. 09/215,370, filed on Dec. 18, 1998, now Pat. No. 6,121,384, which is a division of application No. 08/978,510, filed on Nov. 25, 1997, now Pat. No. 5,869,578, which is a continuation of application No. 08/560,763, filed on Nov. 21, 1995, now abandoned, and a continuation-in-part of application No. 09/225,341, filed on Jan. 5, 1999, now Pat. No. 6,084,016, which is a continuation of application No. 08/828,636, filed on Mar. 31, 1997, now Pat. No. 5,856,388, which is a continuation-in-part of application No. 08/482,520, filed on Jun. 7, 1995, now Pat. No. 5,616,640.

(51) Int. Cl.[7] ............ A63B 37/00; A63B 37/12
(52) U.S. Cl. ............ 524/308; 524/317; 524/320; 473/373; 473/374; 473/378; 473/385
(58) Field of Search ............ 524/308, 317, 524/320; 473/373, 374, 378, 385

(56) References Cited

U.S. PATENT DOCUMENTS

| | | | |
|---|---|---|---|
| 3,264,272 A | 8/1966 | Rees | 260/78.5 |
| 3,472,825 A | 10/1969 | Walter et al. | 260/88.1 |
| 3,819,768 A | 6/1974 | Molitor | 260/897 B |
| 3,926,891 A | 12/1975 | Gross et al. | 260/29.6 E |
| 3,970,626 A | 7/1976 | Hurst et al. | 260/29.6 WB |
| 4,274,637 A | 6/1981 | Molitor | 273/235 R |
| 4,323,247 A | 4/1982 | Keches et al. | 273/235 R |
| 4,431,193 A | 2/1984 | Nesbitt | 273/235 R |
| 4,473,665 A | 9/1984 | Martini-Vvedensky et al. | 521/79 |
| 4,508,309 A | 4/1985 | Brown | 249/81 |
| 4,526,375 A | 7/1985 | Nakada | 273/235 R |
| 4,638,034 A | 1/1987 | McClain | 525/369 |
| 4,884,814 A | 12/1989 | Sullivan | 273/235 R |
| 4,911,451 A | 3/1990 | Sullivan et al. | 273/235 R |
| 5,155,157 A | 10/1992 | Statz et al. | 524/423 |
| 5,160,674 A | 11/1992 | Colton et al. | 264/50 |
| 5,218,057 A | 6/1993 | Kurkov et al. | 525/369 |
| 5,324,783 A | 6/1994 | Sullivan | 525/196 |
| 5,368,304 A * | 11/1994 | Sullivan | |
| 5,397,840 A | 3/1995 | Sullivan et al. | 525/221 |
| 5,508,351 A | 4/1996 | Horiuichi et al. | 525/196 |
| 5,554,698 A | 9/1996 | Wang et al. | 525/330.2 |
| 5,607,687 A | 3/1997 | Bezwada et al. | 424/426 |
| 5,616,640 A | 4/1997 | Harris | 473/378 |
| 5,833,553 A * | 11/1998 | Sullivan | |
| 5,856,388 A | 1/1999 | Harris et al. | 524/320 |
| 5,869,578 A | 2/1999 | Rajagopalan | 525/330.2 |
| 6,255,361 B1 | 7/2001 | Rajagopalan et al. | 521/97 |
| 6,368,237 B1 * | 4/2002 | Sullivan | |
| 6,391,955 B1 * | 5/2002 | Rajagopalan | |

FOREIGN PATENT DOCUMENTS

| | | |
|---|---|---|
| CA | 963380 | 2/1975 |
| GB | 0104316 B1 | 11/1987 |
| WO | WO 93/06137 | 4/1993 |
| WO | WO 96/23009 | 8/1996 |
| WO | 96/40377 | * 12/1996 |
| WO | 96/40826 | * 12/1996 |
| WO | 98/43713 | * 10/1998 |

* cited by examiner

Primary Examiner—David J. Buttner
(74) Attorney, Agent, or Firm—Swidler Berlin Shereff Friedman, LLP

(57) ABSTRACT

A golf ball and process for forming a golf ball having at least one layer, where the layer is formed of a polymer blend comprising a thermoplastic component having a flexural modulus of about 60,000 psi or greater and at least one oxa ester, oxa acid, or a combination thereof. The thermoplastic component may be a high acid acid ionomer or a saponified ionomer.

22 Claims, 2 Drawing Sheets

GOLF BALL COMPOSITIONS CONTAINING OXA ESTERS

This application is a continuation of U.S. patent application Ser. No. 09/608,566, filed Jun. 30, 2000, now U.S. Pat. No. 6,391,955, which is a continuation-in-part of U.S. patent application Ser. No. 09/215,370, filed Dec. 18, 1998, now U.S. Pat. No. 6,121,384, which is a divisional of U.S. patent application Ser. No. 08/978,510, filed Nov. 25, 1997, now U.S. Pat. No. 5,869,578, which is a continuation of U.S. patent application Ser. No. 08/560,763, filed Nov. 21, 1995, now abandoned. U.S. patent application Ser. No. 09/608,566 is also a continuation-in-part of U.S. patent application Ser. No. 09/225,341, filed Jan. 5, 1999, now U.S. Pat. No. 6,084,016, which is a continuation of U.S. patent application Ser. No. 08/828,636, filed Mar. 31, 1997, now U.S. Pat. No. 5,856,388, which is a continuation-in-part of U.S. patent application Ser. No. 08/482,520, filed Jun. 7, 1995, now U.S. Pat. No. 5,616,640. The entire disclosures of these applications are incorporated by reference herein.

FIELD OF THE INVENTION

The present invention relates to golf balls and, in particular, to golf balls having at least one layer formed of a polymer blend formed of a polymer blend comprising at least one oxa ester or a blend of at least one saponified polymeric material and at least one oxa ester. The saponified polymeric material may be unmodified, or may contain at least one pendant functional group that is grafted to the polymer chain. The layer, which may be foamed or unfoamed, may be located in any of the cover or core of the ball or in a mantle layer located between the cover and the core.

BACKGROUND OF THE INVENTION

Three-piece, wound golf balls with balata covers are preferred by many expert golfers. These balls provide a combination of distance, high spin rate, and control that is not available with other types of golf balls. However, balata is easily damaged in normal play, and, thus, lacks the durability required by the average golfer.

In contrast, amateur golfers typically prefer a solid, two-piece ball with an ionomer cover, which provides a combination of distance and durability. Because of the hard ionomer cover, these balls are almost impossible to cut, but also have a very hard "feel", which many golfers find unacceptable, and a lower spin rate, making these balls more difficult to draw or fade. The differences in the spin rate can be attributed to the differences in the composition and construction of both the cover and the core.

Many attempts have been made to produce a golf ball with the control and feel of a wound balata ball and the durability of a solid, two-piece ball, but none have succeeded totally. In various attempts to produce an ideal golf ball, the golfing industry has blended hard ionomer resins (i.e., those ionomer resins having a hardness of about 60 to 66 on the Shore D scale, as measured in accordance with ASTM method D-2240) with a number of softer polymeric materials, such as softer polyurethanes. However, the blends of the hard ionomer resins with the softer polymeric materials have generally been unsatisfactory in that these balls exhibit numerous processing problems. In addition, the balls produced by such a combination are usually short on distance.

While different blend combinations of species of one variety of polymer, such as prior art ionomers, i.e., copolymers of an olefin and an α,β-unsaturated carboxylic acid, have been successfully used in the prior art, different polymers, such as carboxylic acid based ionomers and balata or other non-ionic polymers have not been successfully blended for use in golf ball covers. In general, prior art blends of polymer components are immiscible, i.e., heterogeneous on a microscopic scale, and incompatible, i.e., heterogeneous on a macroscopic scale, unless strong interactions are present between the polymer components in the mixture, such as those observed between carboxylic acid based ionomers and other polymers containing carboxylic acid groups. In particular, this lack of compatibility exists when an ionomer is blended with a polyolefin homopolymer, copolymer, or terpolymer that does not contain ionic, acidic, basic, or other polar pendant groups, and is not produced with a metallocene catalyst. These mixtures often have poor tensile strength, impact strength, and the like. Hence, the golf balls produced from these incompatible mixtures will have inferior golf ball properties such as poor durability, cut resistance, and so on. In contrast, a compatible blend may be heterogeneous on a microscopic scale, but is homogeneous on a macroscopic scale, and, thus, has useful golf ball properties.

In this regard, U.S. Pat. No. 5,397,840 discloses golf ball covers including a blend of "ionic copolymers" and "non-ionic copolymers". However, the "ionic copolymers" are defined as copolymers of an α-olefin and a metal salt of an αβ-unsaturated carboxylic acid, and the "non-ionic copolymers" are copolymers or terpolymers containing ethylene or propylene and acrylic or methacrylic acid monomers. Therefore, strong interactions exist between the metal salts of the "ionic copolymers" and the acrylic or methacrylic acid monomers of the "non-ionic copolymers" that allow compatible blends to be formed. These interactions do not exist in prior art blends of ionomers and polymers that are truly non-ionic or non-polar.

U.S. Pat. No. 5,616,640 to Harris et al. discloses golf ball cover compositions comprising an oxa acid compound having the formula

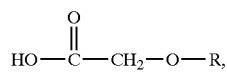

which may be blended with prior art, carboxylic acid based ionomers to provide golf balls having an excellent spin rate and good shear resistance.

U.S. Pat. No. 5,607,687 to Bezwada et al. discloses polymer blends containing absorbable polyoxaesters and blends of polyoxaesters and other biologically compatible polymers for use in surgical devices.

U.S. Pat. No. 5,869,578 to Rajagopalan discloses golf balls comprising "saponified ionomers", i.e., ester based ionomeric polymers produced by carrying out a hydrolysis or saponification on copolymers containing pendant ester groups to form an ionomeric polymer that is less hydrophilic than typical carboxylic acid based ionomers to provide golf balls having enhanced physical properties when compared to prior art golf balls.

Co-pending application Ser. No. 09/132,193 discloses golf balls comprising compatible blends of oxa acids and saponified ionomers.

However, there is no known disclosure of golf balls comprising oxa esters or blends of oxa esters and other polymers, such as saponified ionomers.

Hydrolysis or saponification of alkyl acrylate units in a crosslinkable polymer chain is disclosed by Gross in U.S. Pat. No. 3,926,891. In U.S. Pat. No. 3,970,626, Hurst discloses heating a mixture of an alkali metal hydroxide, a thermoplastic ethylene-alkyl acrylate copolymer and water to saponify the acrylate units and form an aqueous emulsion.

A different approach to hydrolysis or saponification of an ethylene-alkyl acrylate copolymer is disclosed by Kurkov in U.S. Pat. No. 5,218,057, in which the copolymer is mixed with an aqueous solution of an inorganic alkali metal base at a temperature sufficient for saponification to take place and at which the copolymer undergoes a phase change.

All of the prior saponification methods discussed above require that the polymer component be in contact with water, either by conducting the reaction in an aqueous medium or by adding an aqueous solution to the polymer. However, nonaqueous inorganic alkali metal base solutions, e.g., containing an alcohol or polyethylene glycol solvent, are disclosed by U.S. Pat. No. 5,554,698 to Wang et al., although aqueous solutions are disclosed to be preferred.

McClain, in U.S. Pat. No. 4,638,034, discloses a process whereby ethylene-acrylic acid copolymers or their ionomers are prepared from ethylene-alkyl acrylate copolymers by saponifying the latter in the melt with metal hydroxides to form an ionomer and a by-product, i.e., alkanol, then optionally acidifying the ionomer to form the free acid copolymer.

The processes disclosed by the Kurkov, McClain and Wang references, in particular, are incapable of providing optimal product quality since blending and saponifying in a single operation as taught by the subject references leads to rapid saponification, with a concurrent rapid increase in melt viscosity. Due to this rapid increase in melt viscosity, the resultant mixture is non-uniform and therefore the material properties of products made from this material are not consistent throughout the product. U.S. Pat. No. 5,869,578 to Rajagopalan, a patent that issued from one of the parent applications of the present invention, overcame the above deficiencies.

A need exists in the golf ball art for highly durable golf balls, which have improved performance, and may be tailored to have virtually any combination of feel and spin rate. The present invention provides such a golf ball.

SUMMARY OF THE INVENTION

The present invention is directed to a golf ball having least one layer, the layer formed of a polymer blend comprising at least one oxa ester. Useful oxa esters include (a) monoesters of the formula:

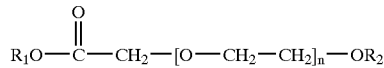

(b) diesters of formula:

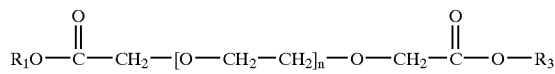

wherein n is an integer greater than or equal to 1, preferably from 1 to 27, $R_1$ and $R_3$ are typically $CH_3$, but may be any organic moiety selected from the group consisting of a linear or branch chained alkyl, a substituted or unsubstituted carbocyclic or heterocyclic groups, and $R_2$ is H or an organic moiety selected from the group consisting of linear and branch chained alkyl, substituted and unsubstituted carbocyclic, and heterocyclic groups;

(c) polymers of the formula

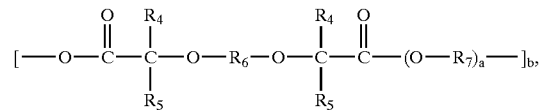

(d) polymers of formula

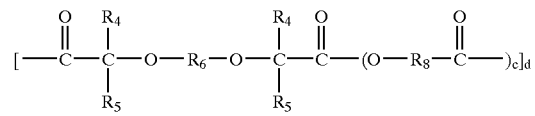

and (e) polymers of formula

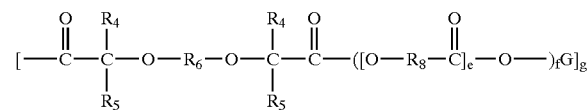

where $R_4$ and $R_5$ are independently selected from the group consisting of hydrogen or an alkyl group containing from 1 to 8 carbon atoms;

a is an integer in the range of from 1 to about 2,000 and preferably from 1 to about 1000;

b, d and g are independently an integer in the range of from about 1 to about 10,000 and preferably is in the range of from about 10 to about 1,000 and most preferably in the range of from about 50 to about 200;

c is an integer in the range from 1 to 2000;

e is an integer in the range of from 1 to about 6,000, preferably from 1 to about 1,200, most preferably from about 1 to about 250;

f is an integer from about 1 to about 200;

$R_6$ is an alkylene containing from 2 to 12 carbon atoms or is an oxyalkylene group of formula:

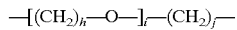

where h is an integer in the range of from about 2 to about 5, i is an integer in the range of from about 0 to about 2,000 and preferably from 0 to 12, and j is an integer in the range of from about 2 to about 5;

$R_7$ is an alkylene unit containing from 2 to 8 methylene units;

$R_8$ is selected from the group consisting of $—C(R_9)(R_{10})—$, $—(CH_2)_3—O—$, $—CH_2—CH_2—O—CH_2—$, $—CR_{11}H—CH_2—$, $—(CH_2)_4—$, $—(CH_2)_k—O—C(O)—$, and $—(CH_2)_k—C(O)—CH_2—$;

$R_9$ and $R_{10}$ are independently hydrogen or an alkyl containing from 1 to about 8 carbon atoms;

$R_{11}$ is hydrogen or methyl;

k is an integer of from about 2 to about 6;

G represents the residue minus from 1 to L hydrogen atoms from the hydroxyl groups of an alcohol previously containing from 1 to about 200 hydroxyl groups; and L is an integer from about 1 to about 200.

Typically a layer of a golf ball comprising the present invention has a hardness of at least 15 Shore A, a flexural modulus of at least 500 psi, and a specific gravity of at least 0.7. Preferably, the flexural modulus of at least 500 to about 300,000 psi.

A golf ball comprising the present invention has an Atti compression of at least 50 and a coefficient of restitution of at least 0.7. Preferably, the Atti compression of the golf ball is at least 60 to about 100.

Golf balls in accordance with the invention preferably have a cover thickness of at least 0.03 inch to about 0.125 inch and at least 60 percent dimple coverage, and a core diameter of at least 0.5 to about 1.63 inches. Where the golf ball of the present invention further comprises at least one optional mantle or intermediate layer, the mantle or intermediate layer has a thickness of at least 0.02 inches.

Golf balls of the present invention preferably have a cover layer hardness of about 40 Shore D to about 70 Shore D and a flexural modulus of about 10,000 to about 100,000 psi, an intermediate layer hardness of about 20 Shore D to about 70 Shore D and a flexural modulus of about 500 to about 100,000 psi and a core layer hardness of about 40 Shore A to about 70 Shore D and a flexural modulus of about 500 to 150,000 psi.

Any of the cover, the core or the center, or the at least one optional mantle or intermediate layer may comprise a density adjusting filler material to increase or decrease the density. The density adjusting filler material may be a metallic powder or a metallic oxide derivative. Preferably, the metallic powder is either titanium, tungsten, tin or copper powder and the metallic oxide derivative is an oxide derivative of titanium, tungsten, copper or tin.

In addition, any of the cover, the core or the center, or the at least one optional mantle or intermediate layer further comprises a wound tensioned elastomeric material wherein the tensioned elastomeric material further comprises natural or synthetic elastomers or blends thereof. An example of a synthetic elastomer is LYCRA. The center may be solid, fluid filled or hollow.

Typically, the oxa ester is present in a polymer blend in an amount of from about 1 to about 35 parts, preferably from about 1 to about 25 parts, and most preferably from about 1 to about 15 parts, based on 100 parts of the polymer blend.

Preferably, the polymer blend further comprises at least one saponified polymer. Typically, the saponified polymer/oxa ester blend comprises from about 1 to about 35 parts of the oxa ester and from about 99 to about 65 parts of the saponified polymer, based on 100 parts of the polymer blend. Preferably, the saponified polymer/oxa ester blend comprises from about 1 to about 25 parts of the oxa ester and from about 99 to about 75 parts of the saponified polymer, and, most preferably from about 1 to about 15 parts of the oxa ester and from about 99 to about 85 parts of the saponified polymer, based on 100 parts of the polymer blend.

The saponified polymer component of this invention has a Shore D hardness of at least 15, as measured by ASTM method D-2240, a flexural modulus, as measured by ASTM method D-790, of at least 500 psi, preferably about 1000 psi to about 100,000 psi, a specific gravity of at least 0.7, preferably from about 0.75 to about 1, a dynamic shear storage modulus (G') at 23° C., as described in ASTM D 4092-90, ASTM D 5279-93, and ASTM D 4065-94, of at least $10^4$ dynes/cm$^2$, preferably about $10^6$ to about $10^{10}$ dynes/cm$^2$, and most preferably from about $10^6$ to about $10^9$ dynes/cm$^2$, and a loss tangent (tan δ) of no more than about 1, preferably, no more than about 0.1, and most preferably from about 0.001 to about 0.01 at 23° C.

Typically, the saponified polymer comprises a first olefinic, monomeric component having from 2 to 8 carbon atoms, a second monomeric component comprising an unsaturated carboxylic acid based acrylate class ester having from 4 to 22 carbon atoms and at least one ester group, wherein at least a portion of the ester groups have been saponified with an inorganic metal base, and, optionally, a third monomeric component selected from the group consisting of carbon monoxide, sulfur dioxide, an anhydride monomer, an unsaturated monocarboxylic acid, an olefin having from 2 to 8 carbon atoms and a vinyl ester or a vinyl ether of an alkyl acid having from 4 to 21 carbon atoms. Metal bases useful in the invention include, but are not limited to, those comprising at least one metallic cation, selected from the group consisting of lithium, sodium, potassium, cesium, magnesium, calcium, barium, manganese, copper, zinc, titanium, tungsten, zirconium, and aluminum, and at least one anion, selected from the group consisting of hydroxide, alkoxide, acetate, carbonate, bicarbonate, oxide, formate, and nitrate.

The first monomeric component of the saponified polymer is typically an α-olefin monomer having a terminal point of unsaturation, such as ethylene, and preferably has the formula:

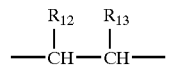

where $R_{12}$ is hydrogen or an alkyl group; and $R_{13}$ is hydrogen, lower alkyl, carbocyclic, or aromatic. Typically, the first monomeric component comprises from about 1 to about 99 percent by weight, preferably from about 10 to about 95 percent by weight, and, most preferably, from about 10 to about 70 percent by weight of the total polymer weight.

Typically, the second monomeric component of the saponified polymer is an unsaturated acrylate class ester having the formula:

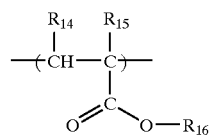

where $R_{14}$ is hydrogen or an alkyl group; $R_{15}$ is hydrogen, lower alkyl, carbocyclic, or aromatic; and $R_{16}$ is selected from the group consisting of $C_nH_{2n+1}$, for n=1 to 18 and phenyl. From 0 to 5H within $R_{16}$ can be replaced by substituents selected from the group consisting of COOH, SO$_3$H, NH$_2$, succinic anhydride and their salts, or $R_{16}$ can be replaced by substituents selected from the group consisting of F, Cl, Br, I, OH, SH, epoxy, silicone, lower alkyl esters, lower alkyl ethers, and aromatic rings, wherein optionally $R_{15}$ and $R_{16}$ can be combined to form a bicyclic ring. Typically, the second monomeric component comprises from about 99 to about 1 percent by weight, preferably from about 90 to about 5 percent by weight, and, most preferably, from about 90 to about 30 percent by weight of the total polymer weight.

Useful third monomeric components of the saponified polymer include, but are not limited to, monomers having the formulae:

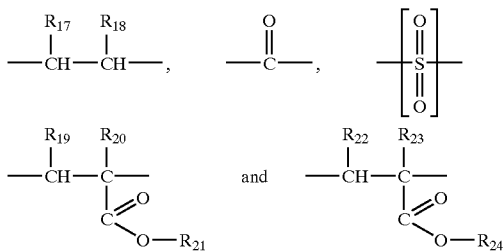

where $R_{17}$, $R_{18}$, $R_{19}$ and $R_{22}$ are independently hydrogen, lower alkyl, carbocyclic or aromatic;

$R_{20}$ and $R_{23}$ are independently hydrogen or lower alkyl;

$R_{21}$ is hydrogen, or is selected from the group consisting of $C_nH_{2n+1}$, for n=1 to 18 and phenyl, in which from 0 to 5H within $R_{21}$ can be replaced by substituents selected from the group consisting of COOH, $SO_3H$, $NH_2$ and their salts, or $R_{21}$ can be replaced by substituents selected from the group consisting of F, Cl, Br, I, OH, SH, silicon, lower alkyl esters, lower alkyl ethers and aromatic rings, wherein optionally $R_{20}$ and $R_{21}$ can be combined to form a bicyclic ring;

$R_{24}$ is hydrogen, or is selected from the group consisting of $C_nH_{2n+1}$, for n=1 to 18 and phenyl, in which from 0 to 5H within $R_{24}$ can be replaced by substituents selected from the group consisting of COOH, $SO_3H$, $NH_2$ and their salts, or $R_{24}$ can be replaced by substituents selected from the group consisting of F, Cl, Br, I, OH, SH, silicon, lower alkyl esters, lower alkyl ethers and aromatic rings, wherein optionally $R_{23}$ and $R_{24}$ can be combined to form a bicyclic ring. Typically, the optional third monomeric component accounts for up to about 49 percent by weight of the total polymer weight.

The saponified polymer, which may be isotactic, syndiotactic, and atactic polymers and combinations thereof, may further comprise at least one functional pendant group added to the polymer by sulfonation, carboxylation, addition of an amine or hydroxy, or by grafting an ethylenically unsaturated monomer onto the saponified polymer using a post-polymerization reaction, and is present in an amount of between about 1 to about 50 percent by weight, preferably, between about 1 and about 25 percent by weight, and, most preferably, between about 1 and about 15 percent by weight, based on the total weight of the polymer. Preferably, the functional pendant group is an anhydride having the formula:

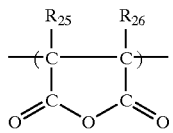

wherein:

$R_{25}$ and $R_{26}$ are the same or different and are selected from the group consisting of hydrogen, linear or branched chain alkyl and substituted or unsubstituted carboxylic groups.

Typically, the golf ball of the invention comprises a cover, a core, and, optionally, an intermediate layer situated between the cover and the core, where the layer may form a portion of any of the cover, the core, and the intermediate layer, and may have a foamed structure. Cores useful in the invention may be of any type known in the art found in golf balls, such as wound cores, solid cores, hollow cores, and cores filled with a fluid, and often comprise cis-polybutadiene.

Polymer blends useful in the invention may further comprise oxa acids, block copolymers of a poly(ether-ester), block copolymers of a poly(ether-amide), styrene-butadiene-styrene block copolymers, styrene-(ethylene-propylene)-styrene or styrene-(ethylene-butylene)-styrene block copolymers, styrene-butadiene-styrene block copolymers grafted with at least one of maleic anhydride or a sulfonic graft or functionality, olefinic copolymers, metallocene catalyzed polymers, block poly(urethane-ester), block poly(urethane-ether), block poly(urethane-caprolactone), polyethylene glycol, polycaprolactone, polycaprolactam, polyesters, polyamides, ethylene-propylene-(diene monomer) terpolymers and their sulfonated or carboxylated derivatives, and PP/EPDM and dynamically vulcanized rubbers, as well as conventional ionomers, such as those comprising an α-olefin, an α,β-unsaturated carboxylic acid, and, optionally, an acrylate class ester as a softening monomer, wherein at least a portion the carboxylic acid groups on the polymer have been neutralized with at least one metal atom.

The invention is further directed to a method for forming a golf ball. The method of the invention comprises forming a polymer blend, which comprises at least one oxa ester; and forming at least one layer of a golf ball from the polymer blend. The method may further comprise forming a polymer comprising a first olefinic monomeric component having from 2 to 8 carbon atoms and a second monomeric component comprising an unsaturated carboxylic acid based acrylate class ester having from 4 to 22 carbon atoms; applying a sufficient amount of heat to the polymer to convert the polymer to a substantially molten state; forming a mixture by adding an inorganic metal base to the molten polymer; saponifying the mixture to form a saponified polymer, wherein a sufficient amount of the inorganic metal base is added to the molten polymer in forming the mixture to obtain a degree of saponification of the polymer ranging between about 1 and 50 percent; and blending the saponified polymer with the at least one oxa ester to form the polymer blend.

Preferably, the mixture of the inorganic metal base and the molten polymer is formed at a temperature such that the mixture has a viscosity that remains substantially unchanged from that of the molten polymer. In addition, the polymer may be formed with a third monomeric component, selected from the group consisting of carbon monoxide, sulfur dioxide, an anhydride monomer, an unsaturated monocarboxylic acid, an olefin having from 2 to 8 carbon atoms, and a vinyl ester or a vinyl ether of an alkyl acid having from 4 to 21 carbon atoms.

DETAILED DESCRIPTION OF THE INVENTION

Figure 1:
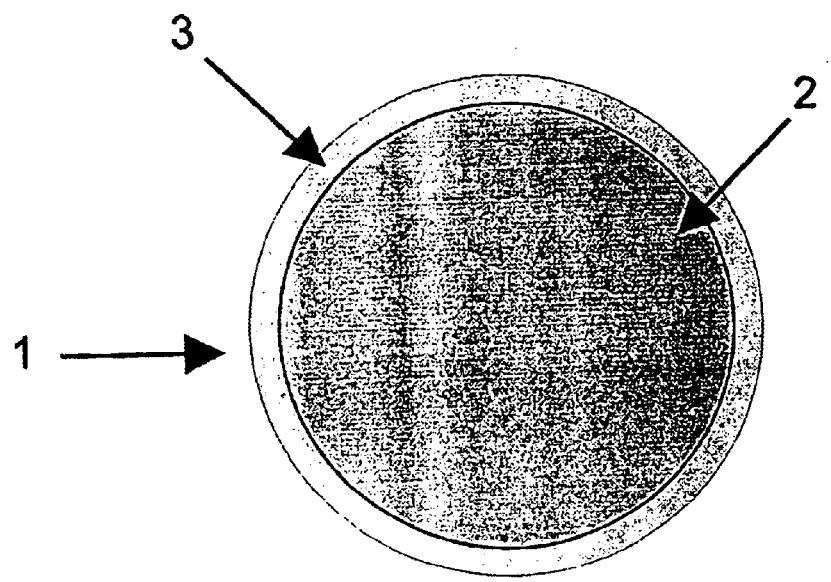
FIG. 1 is a cross-sectional view of a two-piece golf ball according to the invention with a one-piece core.

As used herein, the terms "saponified polymer" and "saponified ionomer" refer to a polymer comprising at least one olefin and at least one unsaturated monomer that contains a pendant ester group, where at least some of the pendant ester groups have been hydrolyzed or saponified. Saponified ionomers differ from prior art ionomers in that any pendant groups that are not modified by the saponification process are ester groups in contrast to the pendant carboxylic acid groups that remain after neutralization in prior art ionomers.

As used herein, the term oxa ester includes include (a) monoesters of the formula:

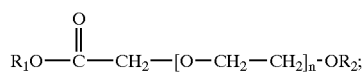

(b) diesters of formula:

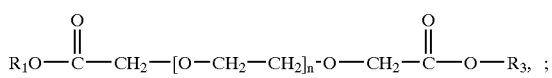

wherein n is an integer greater than or equal to 1, preferably from 1 to 27, $R_1$ and $R_3$ are typically $CH_3$, but may be any organic moiety selected from the group consisting of a linear or branch chained alkyl, a substituted or unsubstituted carbocyclic or heterocyclic groups, and $R_2$ is H or an organic moiety selected from the group consisting of linear and branch chained alkyl, substituted and unsubstituted carbocyclic, and heterocyclic groups;

(c) polymers of formula

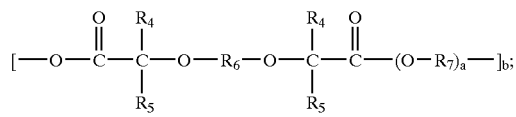

(d) polymers of formula

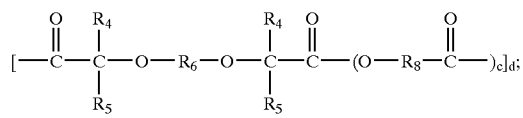

and (e) polymers of formula

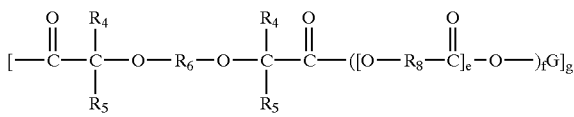

where $R_4$ and $R_5$ are independently selected from the group consisting of hydrogen or an alkyl group containing from 1 to 8 carbon atoms;

a is an integer in the range of from 1 to about 2,000 and preferably from 1 to about 1000;

b, d and g are independently an integer in the range of from about 1 to about 10,000 and preferably is in the range of from about 10 to about 1,000 and most preferably in the range of from about 50 to about 200;

c is an integer in the range of from 1 to 2000 e is an integer in the range of from 1 to about 6,000, preferably from 1 to about 1,200, most preferably from about 1 to about 250;

f is an integer from about 1 to about 200;

$R_6$ is an alkylene containing from 2 to 12 carbon atoms or is an oxyalkylene group of formula:

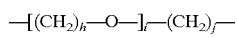

where h is an integer in the range of from about 2 to about 5, i is an integer in the range of from about 0 to about 2,000 and preferably from 0 to 12, and j is an integer in the range of from about 2 to about 5;

$R_7$ is an alkylene unit containing from 2 to 8 methylene units;

$R_8$ is selected from the group consisting of —C($R_9$)($R_{10}$)—, —($CH_2$)$_3$—O—, —$CH_2$—$CH_2$—O—$CH_2$—, —$CR_{11}$H—$CH_2$—, —($CH_2$)$_4$—, —($CH_2$)$_k$—O—C(O)—, and —($CH_2$)$_k$—C(O)—$CH_2$—;

$R_9$ and $R_{10}$ are independently hydrogen or an alkyl containing from 1 to about 8 carbon atoms;

$R_{11}$ is hydrogen or methyl;

k is an integer of from about 2 to about 6;

G represents the residue minus from 1 to e hydrogen atoms from the hydroxyl groups of an alcohol previously containing from 1 to about 200 hydroxyl groups; and L is an integer from about 1 to about 200.

The terms "saponified polymer/oxa ester blend" and "saponified/oxa ester blend", as used herein, refers to any polymer blend that comprises at least one saponified polymer and at least one oxa ester. As used herein with regard to a polymer blend, the term "compatible" refers to a blend of two or more polymers, having useful golf ball properties, that is homogeneous on a macroscopic scale. Compatible blends may be miscible (i.e., homogeneous on a microscopic scale), or at least partially immiscible (i.e., heterogeneous on a microscopic scale, but homogeneous on a macroscopic scale) and have a "reduced interfacial tension" at the polymer interface. The term "incompatible" refers to a mixture of at least two polymers that is heterogeneous on both a microscopic scale and a macroscopic scale, such that useful golf ball properties, such as durability, are lacking.

As used herein, the term "layer" includes any generally spherical portion of a golf ball or golf ball core, center (hollow, solid, fluid filled type), or intermediate layer, including one-piece cores and one-piece balls. An "intermediate layer" (also known as inner layer or mantle layer) is defined herein as a portion of the golf ball that occupies a volume between the cover and the core. Such an intermediate layer may be distinguished from a cover or a core by some difference in the property of the materials comprising the layers. Moreover, a "cover" or a "core" as these terms are used herein may comprise a single layer or a plurality of layers. An intermediate layer may be used, if desired, with a multilayer cover or a multilayer core, or with both a multilayer cover and a multilayer core. Therefore, an intermediate layer is also sometimes referred to in the art as an inner cover layer, as an outer core layer or as a mantle layer.

As used herein, the term "cover" means the outermost portion of a golf ball. A cover typically includes at least one layer and may contain indentations such as dimples and/or ridges. Paints and/or laminates are typically disposed about the cover to protect the golf ball during use thereof.

As used herein, the term "core" means the innermost portion of a golf ball, and may include one or more layers.

When more than one layer is contemplated, the core includes a center and at least one mantle layer disposed thereabout. At least a portion of the core, typically the center, is solid or fluid. The core may also include one or more wound layers including at least one tensioned elastomeric material wound about the center. Preferably, the tensioned elastomeric material comprises natural or a synthetic elastomers or blends thereof. Preferably the synthetic elastomer is LYCRA.

As used herein, the term "Atti compression" is defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball and/or a golf ball core.

As used herein, the term "coefficient of restitution" (COR) is calculated by dividing the rebound velocity of the golf ball by the incoming velocity when a golf ball is shot out of an air cannon. The COR testing is conducted over a range of incoming velocities and determined at an inbound velocity of 125 ft/s.

As used herein, the term "foamed" encompasses "conventional foamed" materials that have cells with an average diameter of greater than 100 μm and "microcellular" type materials that have closed cell sizes on the order of 2 to 25 μm. Examples of conventional foamed materials include those described in U.S. Pat. No. 4,274,637. Examples of microcellular closed cell foams include those foams disclosed in U.S. Pat. No. 4,473,665 and U.S. Pat. No. 5,160,674.

As used herein, the term "fluid" means a gas, liquid, gel, paste, or the like, or a combination thereof.

The term "about," as used herein in connection with one or more numbers or numerical ranges, should be understood to refer to all such numbers, including all numbers in a range.

As used herein, the term "metallocene catalyzed polymer" refers to any polymer, copolymer, or terpolymer, and, in particular, any polyolefin, polymerized using a metallocene catalyst. The term "grafted metallocene catalyzed polymer" refers to any metallocene catalyzed polymer in which the metallocene catalyzed polymer has been subjected to a post-polymerization reaction to graft at least one functional group onto the metallocene catalyzed polymer. Similarly, the term "non-grafted metallocene catalyzed polymer" refers to any metallocene catalyzed polymer in which the metallocene catalyzed polymer has not been subjected to such a post-polymerization reaction. Accordingly, the term "metallocene catalyzed polymer" encompasses both non-grafted metallocene catalyzed polymers and grafted metallocene catalyzed polymers.

As used herein, the terms "conventional ionomers" and "conventional thermoplastic ionomers", refer to copolymers and terpolymers comprising an α-olefin, an α,β-unsaturated carboxylic acid, and, optionally, a softening monomer, such as an acrylate class ester, where at least a portion the carboxylic acid groups on the polymer have been neutralized with at least one metal atom, such as lithium, sodium, potassium, cesium, magnesium, calcium, barium, zinc, manganese, copper, and aluminum. Ethylene methacrylic acid ionomers and ethylene acrylic acid ionomers and their terpolymers are sold commercially under the trade names SURLYN® and IOTEK® by DuPont and Exxon respectively.

The present invention relates to golf balls including at least one foamed or unfoamed layer that comprises at least one oxa ester, which may be blended with prior art golf ball materials, such as conventional ionomers and polybutadiene, or with at least one saponified polymer to form a saponified polymer/oxa ester blend. As noted above, the layer may be in any of the core, the cover, or a mantle layer situated between the cover and the core.

Golf balls of the invention comprise at least one layer comprising an oxa ester. The layer is typically formed from a polymer blend comprising from about 35 to 1 parts, preferably from about 25 to about 1 parts, and most preferably from about 15 to about 1 parts of at least one oxa ester, based on 100 parts by weight of the polymer blend. Preferably, the polymer blend comprises at least one saponified polymer/oxa ester blend of from about 65 to about 99 parts, preferably from about 75 to about 99 parts, and most preferably from about 85 to about 99 parts of at least one saponified polymer and from about 35 to 1 parts, preferably from about 25 to about 1 parts, and most preferably from about 15 to about 1 parts of at least one oxa ester, based on 100 parts by weight of the saponified polymer/oxa ester blend. Typically, the layer has a thickness of at least 0.005 to about 0.125 inch and a Shore D hardness of at least 15 to about 80. Where the layer is foamed, the polymer blends may be foamed during molding by any conventional foaming or blowing agent. Preferably, foamed layers incorporating an oxa ester or oxa ester blend have a flexural modulus of at least 1,000 to about 150,000 psi.

The other polymers that can be used in conjunction with oxa esters in golf balls include: block copolymers of a poly(ether-ester), such as HYTREL® available from DuPont, block copolymers of a poly(ether-amide), such as PEBAX® available from Elf Atochem, styrene-butadiene-styrene block copolymers, such as the KRATON D® grades available from Shell Chemical, styrene-(ethylene-propylene)-styrene or styrene-(ethylene-butylene)-styrene block copolymers, such as the KRATON G® series from Shell Chemical, either of the KRATON®s with maleic anhydride or sulfonic graft or functionality, such as the KRATON FD® or KRATON FG® series available from Shell Chemical, olefinic copolymers, such as the ethylene-acrylate or ethylene methacrylate series available from Quantum, metallocene catalyzed polymers, including ethylene-octene copolymers made from metallocene catalysts, available as the AFFINITY® or ENGAGE® series from Dow Chemical and DuPont-Dow Elastomers, and ethylene-alpha olefin copolymers and terpolymers made from metallocene catalysts, available as the EXACT® series from Exxon Chemical, block poly(urethane-ester) or block poly(urethane-ether) or block poly(urethane-caprolactone), such as the ESTANE series available from BF Goodrich, polyethylene glycol, such as CARBOWAX available from Union Carbide, homo and copolymers produced from non-metallocene catalysts, such as single-site catalysts, polycaprolactone, polycaprolactam, polyesters, such as EKTAR available from Eastman, polyamides, such as nylon 6 or nylon 6,6, available from DuPont and ICI, etbylene-propylene-(diene monomer) terpolymers and their sulfonated or carboxylated derivatives, and PP/EPDM and dynamically vulcanized rubbers, such as SANTOPRENE from Monsanto.

Golf ball compositions in accordance with the invention may be thermoformed, and, thus, can be either compression or injection molded to form a layer of foamed or unfoamed saponified polymer/oxa ester blend in the cover, core, or mantle of a golf ball according to the invention. Polymer blends comprising oxa esters or, preferably, saponified polymer/oxa ester blends are resilient, easily processed materials that allow highly durable golf balls to be produced with improved performance and virtually any combination of feel and spin rate.

A golf ball in accordance with the invention comprise at least one layer, which may form at least a part of a cover or a core of the ball, comprising at least one oxa ester. Covers and cores of golf balls of the invention may also comprise saponified polymer/oxa ester blends, saponified polymers, oxa acids, saponified polymer/oxa ester blends and other polymers, which may include conventional ionomers, grafted metallocene catalyzed polymers or polymer blends, non-grafted metallocene catalyzed polymers or polymer blends, or conventional materials, such as poly-butadiene, as well as additives well known in the golf ball art. Useful cores, including those comprising the oxa esters or saponified polymer/oxa ester blends of the invention, may be either one-piece, comprising a single piece of foamed or unfoamed material, or multi-piece, comprising a fluid or solid core or center and one or more layers in which any of the center or at least one of the layers may comprise a foamed or unfoamed blend comprising an oxa ester or a saponified polymer and an oxa ester.

For example, FIG. 1 illustrates a golf ball according to the invention with a one-piece core. Golf ball 1 comprises a core 2 and a cover 3, wherein at least one of core 2 and cover 3 incorporates at least one foamed or unfoamed layer comprising at least one oxa ester or saponified polymer/oxa ester blend.

Figure 2:
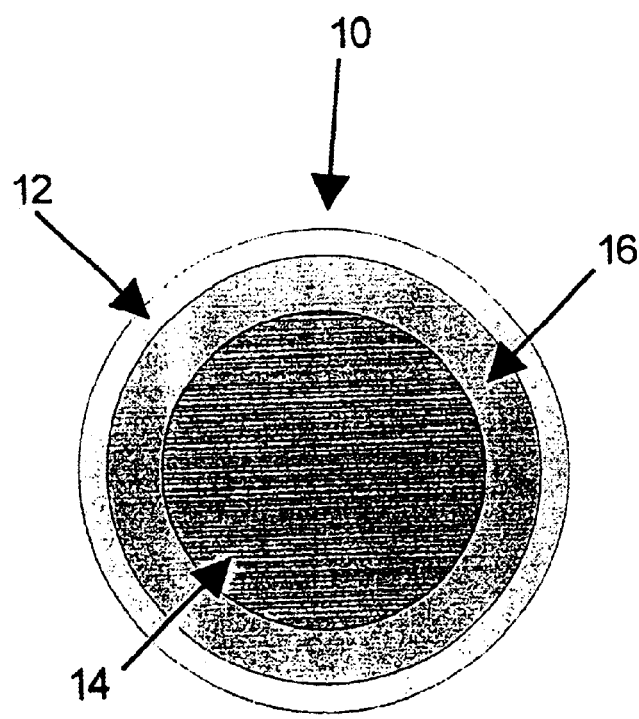
FIG. 2 is a cross-sectional view of a golf ball according to the invention incorporating a multi-layer core.

Similarly, FIG. 2 illustrates a golf ball according to the invention incorporating a multi-piece core. Golf ball 10 comprises a cover 12, a core having a center 14 and at least one additional core layer 16. Any of the cover 12, center 14, or core layer 16 may incorporate at least one foamed or unfoamed layer that comprises at least one oxa ester or saponified polymer/oxa ester blend.

Conventional materials useful in centers, cores, or core layers of the golf balls of the invention include, but are not limited to, compositions having a base rubber, a crosslinking agent, and a density adjusting filler. The base rubber typically includes natural or synthetic rubbers. A preferred base rubber is 1,4-polybutadiene having a cis-structure of at least 40 percent. Natural rubber, polyisoprene rubber and/or styrene-butadiene rubber may be optionally added to the 1,4-polybutadiene. Crosslinking agents include metal salts of unsaturated fatty acids, such as zinc or magnesium salts of acrylic or methacrylic acid. The density adjusting filler typically includes materials such as zinc oxide, barium sulfate, silica, calcium carbonate, zinc carbonate and the like. Golf balls of the invention may also have conventional wound cores, where the core comprises a fluid or solid center wrapped in elastomeric windings.

Golf balls of the invention may also include a mantle layer or other intermediate layer situated between the cover and the core. Preferably, the mantle layer comprises a least one foamed or unfoamed layer that comprises at least one oxa ester or saponified polymer/oxa ester blend, but may also comprise at least one conventional ionomer, oxa acid, saponified polymer/oxa acid blend, or other polymer blend, such as those formed from a grafted or non-grafted metallocene catalyzed polymer or polymer blend, or from any other suitable polymeric material having the desired properties, including, but not limited to, block copolymers of a poly(ether-ester), such as HYTREL®, available from DuPont, block copolymers of a poly(ether-amide), such as PEBAX®, available from Elf Atochem, styrene-butadiene-styrene and styrene-(ethylene-propylene)-styrene or styrene-(ethylene-butylene)-styrene block copolymers, and their functionalized derivatives, such as KRATON D®, KRATON G®, and KRATON FG® from Shell Chemical.

Figure 3:
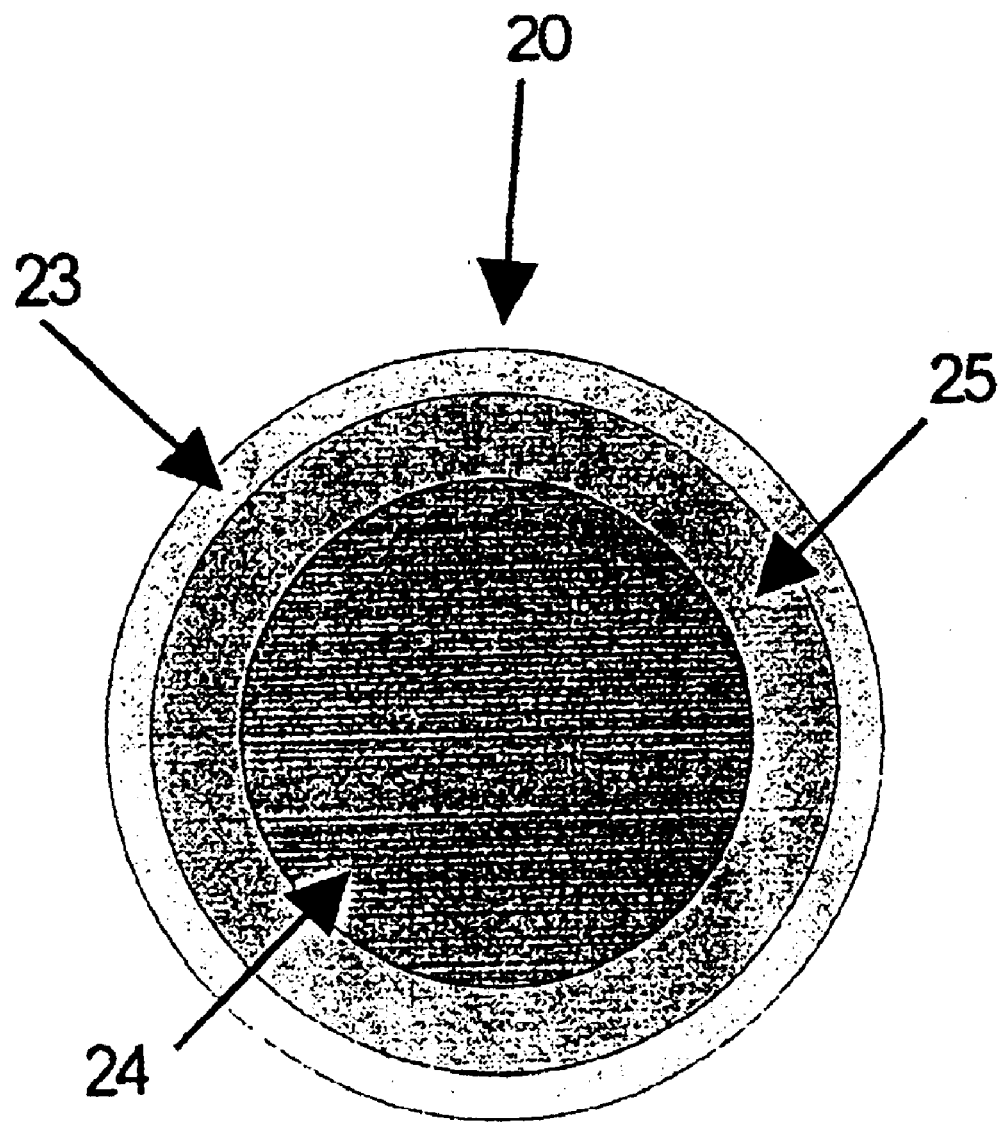
FIG. 3 is a cross-sectional view of a golf ball according to the invention incorporating a mantle layer between the cover and the core.

A golf ball incorporating a mantle layer is illustrated in FIG. 3, which depicts golf ball 20, having cover 23, core 24, and a mantle layer 25 situated between the cover and the core. Any of cover 23, core 24, and mantle layer 25 may incorporate at least one foamed or unfoamed layer comprising at least one oxa ester or saponified polymer/oxa ester blend. Moreover, core 24 may be a one-piece core, a multi-layer core, or a wound core, having a solid or fluid center formed from one or more of the materials described above.

Golf balls according to the invention may also incorporate foamed or unfoamed cover layers comprising at least one oxa ester, saponified polymer/oxa ester blends, saponified polymer, saponified polymer/oxa acid blend, grafted metallocene catalyzed polymers or polymer blends, non-grafted metallocene catalyzed polymers or polymer blends and metallocene catalyzed polymers or conventional materials, including balata and ionomer cover stock. Oxa ester and saponified polymer/oxa ester blend cover layers according to the invention may be used with conventional solid or wound cores, as well as those comprising other core materials, such as those described above, including, but not limited to, oxa esters, saponified polymer/oxa ester blends, oxa acids, saponified polymers, saponified polymer/oxa acid blend, grafted and non-grafted metallocene catalyzed polymers and polymer blends. Preferably, the cover of a golf ball according to the invention is formed from a polymer blend comprising at least one oxa ester or saponified polymer/oxa ester blend.

The use of a foamed layers allows the golf ball designer to vary the density or mass distribution of the ball to adjust the angular moment of inertia, and, thus, the spin rate and performance of the ball. Foamed materials also offer a potential cost savings due to the reduced use of polymeric material.

As used herein with regard to saponified polymers and oxa esters, the phrase "branched or straight chain alkyl" means any substituted or unsubstituted acyclic carbon-containing compounds. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, pentene, hexene, heptene, octene, norbornene, nonene, decene and the like. The ordinary skilled artisan is familiar with numerous linear and branched alkyl groups, which are within the scope of the present invention.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, "substituted and unsubstituted carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, "substituted and unsubstituted aryl groups" refers to any functional group comprising a hydrocarbon ring having a system of conjugated double bonds, such as phenyl, naphthyl, anisyl, toluyl, xylenyl and the like.

According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can include nitro groups.

As used herein, "heterocyclic groups" means closed cyclic carbon-containing compounds wherein one or more of the atoms in the ring is an element other than carbon, e.g. sulfur, nitrogen, etc, including but not limited to pyridine, pyrole, furan, thiophene, and purine.

Saponified Polymers and Polymer Blends

Saponified polymers useful in the invention can be made from polymers of formula I:

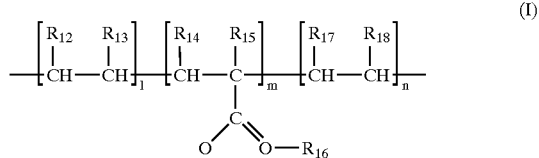

(I)

wherein:

$R_{12}$ and $R_{14}$ are independently hydrogen, alkyl such as methyl, ethyl, and branched or straight chain propyl, butyl, pentyl, hexyl, heptyl, and octyl;

$R_{13}$ and $R_{15}$ are independently hydrogen, lower alkyl including $C_1$–$C_5$ carbocyclic, or aromatic;

$R_{16}$ is selected from the group consisting of $C_nH_{2n+1}$, for n=1 to 18 (which includes, for example, $CH_3$, $C_2H_5$, $C_3H_7$, $C_4H_9$, $C_5H_{11}$, $C_6H_{13}$, $C_7H_{15}$, $C_9H_{19}$, $C_{10}H_{21}$) and phenyl, in which from 0 to 5H within $R_{16}$ can be replaced by substituents selected from the group consisting of COOH, $SO_3H$, $NH_2$, succinic anhydride and their salts, or $R_{16}$ can be replaced by substituents selected from the group consisting of F, Cl, Br, I, OH, SH, epoxy, silicone, lower alkyl esters, lower alkyl ethers, and aromatic rings, wherein optionally $R_{15}$ and $R_{16}$ can be combined to form a bicyclic ring;

$R_{17}$ and $R_{18}$ are independently hydrogen, lower alkyl including $C_1$–$C_5$, carbocyclic, or aromatic;

wherein l, m and n are the relative percentages of each co-monomer.

Saponified polymers can also be formed from polymers of formula II:

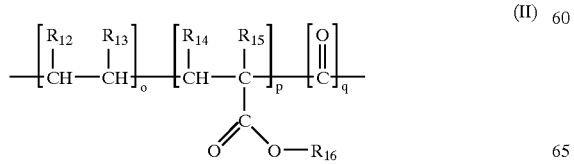

(II)

wherein:
$R_{12}$, $R_{13}$, $R_{14}$, $R_{15}$, and $R_{16}$ are as defined above; and wherein o, p and q are the relative percentages of each co-monomer;

from polymers of formula III:

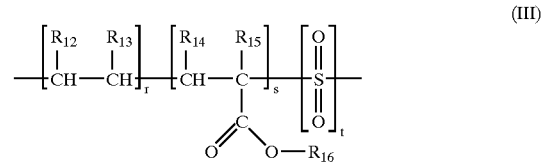

(III)

wherein:
$R_{12}$, $R_{13}$, $R_{14}$, $R_{15}$, and $R_{16}$ are as defined above; and wherein r, s and t are the relative percentages of each co-monomer;

and from polymers of formula IV:

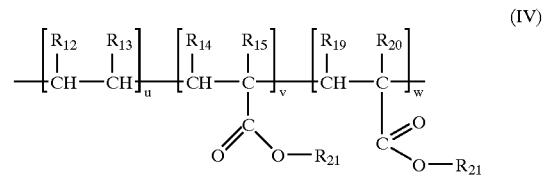

(IV)

wherein:
$R_{12}$, $R_{13}$, $R_{14}$, $R_{15}$, and $R_{16}$ are as defined above; $R_{19}$ is hydrogen, lower alkyl including $C_1$–$C_5$, carbocyclic, or aromatic; $R_{20}$ is hydrogen or lower alkyl including $C_1$–$C_5$; and $R_{21}$ is hydrogen, or is selected from the group consisting of $C_nH_{2n+1}$, for n=1 to 18 and phenyl, in which from 0 to 5H within $R_{21}$ can be replaced by substituents selected from the group consisting of COOH, $SO_3H$, $NH_2$, succinic anhydride and their salts, or $R_{21}$ can be replaced by substituents selected from the group consisting of F, Cl, Br, I, OH, SH, epoxy, silicon, lower alkyl esters, lower alkyl ethers and aromatic rings, wherein optionally $R_{20}$ and $R_{21}$ can be combined to form a bicyclic ring; and wherein u, v and w are the relative percentages of each co-monomer.

In addition, saponified polymers can be formed from polymers of formula V:

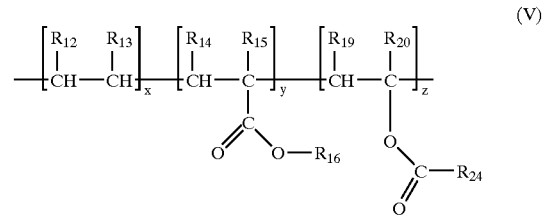

(V)

wherein:
$R_{12}$–$R_{16}$ are as defined above; $R_{22}$ is hydrogen, lower alkyl including $C_1$–$C_5$, carbocyclic, or aromatic; $R_{23}$ is hydrogen or lower alkyl including $C_1$–$C_5$; and $R_{24}$ is hydrogen or is selected from the group consisting of $C_nH_{2n+1}$ for n=1 to 18 and phenyl, in which from 0 to 5H within $R_{24}$ can be replaced by substituents selected from the group consisting of COOH, $SO_3H$, $NH_2$, succinic anhydride and their salts, or $R_{24}$ can be replaced by substituents selected from the group consisting of F, Cl, Br, I, OH, SH, epoxy, silicone, lower alkyl esters, lower alkyl ethers and aromatic rings; and $R_{24}$ is the same as $R_{21}$, wherein optionally $R_{23}$ and $R_{24}$ can be combined to form a bicyclic ring; and wherein x, y and z are the relative percentages of each co-monomer.

In each of the polymers described above, $R_{12}$ and $R_{13}$ can be any combination of alkyl, carbocyclic or aromatic groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl. Comonomer units according to the above formulae are easily manufactured according to techniques and synthetic strategies well known to the skilled artisan. These comonomers are also commercially available from a number of commercial sources.

Saponified polymers can be random, block or alternating polymers and may be made by blending two, three, four, five or more different monomers according to processes well known to one of ordinary skill in the art. Additionally, the subject polymers may be isotactic, syndiotactic or atactic, or any combination of these forms of types of polymers. The pendant groups creating the isotactic, syndiotactic or atactic polymers can be chosen to determine the interactions between the different polymer chains making up the resin to control the final properties of the resins used in golf ball covers. Aromatic and cyclic olefins can be used in the present invention as well as such specific groups as methyl and phenyl.

The comonomers described herein can be combined in a variety of ways to provide a final copolymer with a variety of characteristics. The letters k, n, q, t and w represent numbers that can independently range from 1–99 percent, preferably from 10–95 percent, more preferably from 10–70 percent and, most preferably, from about 10–50 percent. The coefficients e, o, r, u and x can independently range from 99–1 percent, preferably from 90–5 percent, more preferably from 90–30 percent, and most preferred from 90–50 percent, and m, p, s, v and y can independently range from 0 to 49 percent.

Graft copolymers of the saponified polymers described above can also be prepared for use in forming golf balls. For example, graft polymers can be produced such that the graft segment making up the linkage between polymer chains comprises an anhydride, wherein "anhydride" is taken to mean a compound having the formula:

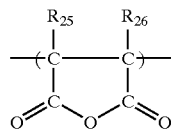

wherein:
$R_{25}$ and $R_{26}$ are the same or different and are chosen from among hydrogen, linear or branched chain alkyl and substituted or unsubstituted carboxylic groups. Alternately, however, other grafting agents containing double or triple bonds can be used. Examples of these materials include, but are not limited to, acrylates, styrene and butadiene.

Grafting the polymer molecules of the present invention can be accomplished according to any technique known in the art. See, e.g., *Block and Graft Copolymers*, by R. Ceresa, pub. by Butterworths, London, U.S. (1962), incorporated by reference herein. It is preferred that any grafting of the polymers of the present invention be accomplished by adding from about 1 to about 50 percent, or preferably from about 1 to about 25 percent and most preferably from about 1 to about 15 percent of a grafting agent, such as an anhydride according to the formula above. The grafting agents can be added either as a solid or a non-aqueous liquid, to a polymer according to the present invention. Such post reaction grafting can make the final grafted polymer more flexible.

Polymers that can be saponified for use in the present invention can be synthesized by a variety of methods, including metallocene catalysis, since it is well known in the art of polymer synthesis that many different synthetic protocols can be used to prepare a given compound. Different routes can involve more or less expensive reagents, easier or more difficult separation or purification procedures, straightforward or cumbersome scale-up, and higher or lower yield. The skilled synthetic polymer chemist knows well how to balance the competing characteristics of synthetic strategies. Thus, the saponified polymers useful in the present invention are not limited by the choice of synthetic strategy, and any synthetic strategy that yields the saponified polymers described above can be used.

Polymers useful for saponification preferably comprise: (1) a first monomeric component comprising an olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, an olefin having from 2 to 8 carbon atoms and a vinyl ester or a vinyl ether of an alkyl acid having from 4 to 21 carbon atoms.

Saponified polymers are preferably prepared by adding a metal base or metal salt in the form of a solid or a solution to a polymer, such as the polymers described in the previous paragraph. Preferably, however, the metal base is in the form of a solid, such as a powder or a pellet. Powdered bases used in the invention preferably have an average powder particle diameter of at least 1 to 500 microns. More preferably, such powders have an average particle diameter of 10 to 100 microns. In the case of pellets, substantially any commercially available pellet particle size can be used.

Alternately, the metal base can be added in the form of a solution. Preferably, the solution is non-aqueous so that difficulties arising from incomplete removal of water during subsequent processing and use are avoided. Such non-aqueous solutions typically comprise solvents such as alcohol, acetic acid and acetic anhydride, although other solvents may, of course, be used.

The metal base comprises at least one metallic cation, such as lithium, sodium, potassium, cesium, magnesium, calcium, barium, zinc, manganese, copper, aluminum, and at least one anion, such as hydroxide, alkoxide, acetate, carbonate, bicarbonate, oxide, formate, or nitrate.

The polymers described herein are preferably saponified or hydrolyzed by introducing the polymer into an extruder inlet zone, and melting and mixing the polymer in the inlet zone; passing the molten polymer through an addition zone within the extruder downstream from the inlet zone; and adding a metal base into the molten polymer as it passes through the addition zone. The base may be added to the molten polymer under saponification conditions until the polymer is at least partially saponified, as indicated by, for example, its melt index or by titrating versus an acid.

However, the metal base is preferably mixed with the polymer under non-saponification conditions. Instead of simultaneously mixing and saponifying or hydrolyzing as practiced in the prior art, these operations are carried out separately. In the first step, the polymer is heated to a substantially molten state at a temperature typically between about 50–350° C., depending upon the polymer chosen, to facilitate subsequent mixing with a metal base. This preheating step assures a greater degree of homogeneity in the final product, and provides a final product having correspondingly improved properties.

In the next step, the metal base is added to the molten polymer, and the polymer and metal base are extensively mixed under conditions in which no substantial hydrolysis occurs. A sufficient amount of metal base must be added overall to obtain a degree of saponification of the polymer between about 1 and about 50 percent. The mixing is carried out at a temperature slightly higher than the melting temperature of the polymer. For mixing on an extruder, the screw speed can be varied between about 20–500 rpm, depending upon the material's viscosity, i.e., the higher the viscosity, the greater the screw rpm required. Furthermore, as would be well understood by one of ordinary skill in the art, the depth of the conveying element of the extruder is chosen to prevent substantial hydrolysis of the material during mixing.

Alternately, the mixing may be accomplished using a roll mill. In such a case, the cylinder roll speed is adjusted to between about 5–100 rpm depending upon the viscosity of the material. Additionally, the mill gap is adjusted as necessary to control the amount of shear, and thus the degree of hydrolysis. The metal base may be added all at once to the molten polymer, or alternately it may be introduced in batches or stages.

In a third step, conditions are provided such that a hydrolysis or saponification reaction occurs between the polymer and the metal base. Saponification is achieved by continuous mixing of the polymer and base at an elevated temperature, which is substantially higher than the melting point temperature.

This process offers several improvements over the methods disclosed in the prior art. First, it provides for greater ease of mixing of the reactants before the reaction begins. Because the melt viscosity of the non-salt polymer is much lower than the salt polymer form, the melt mixing of the polymer and metal base is more readily carried out with lower input power requirements. Additionally, mixing of polymer and metal base is more uniform because there are no substantially hydrolyzed or saponified regions of high melt viscosity present within regions that have not yet reacted and, therefore, have low melt viscosity. Furthermore, the degree of mixing or dispersion of the base in the polymer is more easily controlled since melt viscosity is more uniform throughout the volume of molten polymer.

Once substantial saponification begins, the reaction is thought to be more uniform than the methods disclosed in the prior art.

This process is preferably accomplished using a twin screw extruder wherein the twin screw extruder comprises melting, addition, and mixing zone means. The process can further be accomplished using a master batch comprising a concentrated amount of metal base in a polymer, with the same or different composition as the polymer introduced into the inlet zone, wherein the master batch is added from a side-stream extruder. The side-stream extruder can be a twin screw extruder comprising melting, addition, and mixing zone means.

Alternatively, the continuous process of saponifying or hydrolyzing the polymers useful in the invention comprises introducing the polymer into an inlet zone of an extruder, and melting and mixing the polymer in the inlet zone; passing the molten polymer through at least two addition zones connected in series; and adding a portion of a metal base into the molten polymer as it passes through each addition zone until the polymer is at least partially saponified.

This process can be accomplished using a twin screw extruder wherein the twin screw extruder comprises melting, addition, and mixing zone means. The process can further be accomplished using a single or a plurality of master batches comprising a concentrated amount of metal base in a polymer, with the same or different composition as the polymer introduced into the inlet zone, and with the same or different amount of metal base as the other master batches, wherein the master batch is added from a side-stream extruder. The process can be accomplished with a single or with multiple side-stream extruders which are twin screw extruders comprising melting, addition, and mixing zone means.

For use in saponified polymer/oxa ester blends of the present invention, a saponified polymer with ionomeric character can be blended with the other similar polymers, having a different metal base cation or distribution of cationic species than used to make the first saponified polymer, to yield a blend with desirable golf ball properties. Alternatively, two different saponified polymers with ionomeric character, having the same metal base cation can be blended to yield a useful blend. The two polymers can differ in their degree of hydrolysis, degree of subsequent acidification, molecular weight, molecular weight distribution, tacticity, blockiness, etc.

Oxa Acids

Any number of oxa acid compounds blended with oxa ester compounds or oxa ester blends are contemplated as being useful in the present invention. Some specific oxa acids useful in the novel golf ball compositions of the present invention include 3,6-dioxaheptanoic acid having the formula:

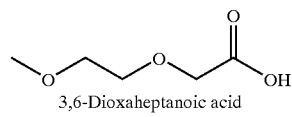
3,6-Dioxaheptanoic acid 3,6,9 trioxadecanoic acid, having the formula:

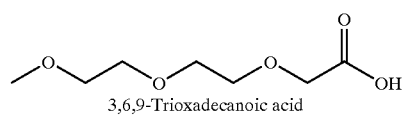
3,6,9-Trioxadecanoic acid 3,6,9-trioxaundecanedioic acid, having the formula:

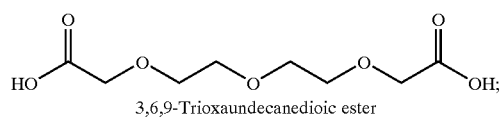
3,6,9-Trioxaundecanedioic ester and polyglycol diacid, having the formula, where n=about 10 to about 12:

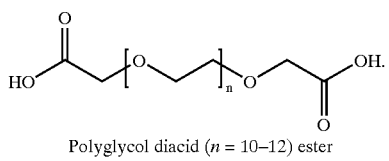

Polyglycol diacid (n = 10–12) ester

Numerous oxa acid compounds useful in the compositions of the present invention are available from Hoechst Celanese Corporation, Fine Chemicals Division under the trade name "Oxa Acids."

Oxa Ester Blends

As discussed above, oxa esters may be with other polymers or ionomers, according to methods well known in the art, to form compositions useful for forming golf balls. For example, oxa esters may be blended with saponified polymers to form saponified polymer/oxa ester blends, which be used alone or blended with thermoplastic ionomers, such as ethylene methacrylic acid ionomers and ethylene acrylic acid ionomers and their terpolymers, which are sold commercially under the trade names SURLYN® and IOTEK® by DuPont and Exxon respectively.

More preferably, the other polymers that can be used in conjunction with saponified polymer/oxa ester blends in golf ball covers include: block copolymers of a poly(ether-ester), such as HYTREL® available from DuPont, block copolymers of a poly(ether-amide), such as PEBAX® available from Elf Atochem, styrene-butadiene-styrene block copolymers, such as the KRATON D® grades available from Shell Chemical, styrene-(ethylene-propylene)-styrene or styrene-(ethylene-butylene)-styrene block copolymers, such as the KRATON G® series from Shell Chemical, either of the KRATON®s with maleic anhydride or sulfonic graft or functionality, such as the KRATON FD® or KRATON FG® series available from Shell Chemical, olefinic copolymers, such as the ethylene-acrylate or ethylene methacrylate series available from Quantum, metallocene catalyzed polymers, including ethylene-octene copolymers made from metallocene catalysts, available as the AFFINITY® or ENGAGE® series from Dow, and ethylene-alpha olefin copolymers and terpolymers made from metallocene catalysts, available as the EXACT® series from Exxon, block poly(urethane-ester) or block poly(urethane-ether) or block poly(urethane-caprolactone), such as the ESTANE® series available from BF Goodrich, polyethylene glycol, such as CARBOWAX available from Union Carbide, polycaprolactone, polycaprolactam, polyesters, such as EKTAR available from Eastman, polyamides, such as nylon 6 or nylon 6,6, available from DuPont and ICI, ethylene-propylene-(diene monomer) terpolymers and their sulfonated or carboxylated derivatives, and PP/EPDM and dynamically vulcanized rubbers, such as SANTOPRENE from Monsanto.

The saponified polymer/oxa ester blends of the present invention can be prepared with or without the addition of a compatibilizer, and with varying molecular architecture of blend components, such as varying molecular weight, tacticity, degrees of blockiness, etc., as is well known to those knowledgeable in the art of blending polymers.

The amounts of polymers used to form saponified polymer/oxa ester blends can vary from about 1 to about 99 parts of the saponified polymer/oxa ester blend to about 99 to about 1 parts of other polymers or ionomers, based on the total weight of polymers. More preferred ratios of about 95 to about 5 parts of the saponified polymer/oxa ester blend with about 5 to about 95 parts of one or more other polymers. Most preferred is from about 95 to about 10 parts of the subject saponified polymer/oxa ester blends and from about 5 to about 90 parts of the other polymer or ionomer.

Blending of the saponified polymer/oxa ester blends is accomplished in a conventional manner using conventional equipment. Good results have been obtained by mixing the resins in a solid, pelletized form and then placing the mix into a hopper which is used to feed the heated barrel of the injection molding machine. Further mixing is accomplished by a screw in the heated barrel. For golf ball covers, the injection molding machine may be used either to make preformed half-shells for compression molding about a core or for molding flowable cover stock about a core using a retractable-pin mold. Similar techniques may be used to form golf ball cores and mantle or intermediate layers situated between a cover an a core with any of the compositions of the invention. Such machines and techniques are conventional.

Additional components which can be added to the golf ball compositions of the present invention may include U.V. stabilizers, antioxidants, dyes, density adjusting fillers, such as zinc oxide, barium sulphate and tungsten carbide, white pigments, mica, talc, nano-fillers, colored pigments, fluorescent pigments, optical brighteners, light stabilizers, metallic powders, such as titanium, zinc, tungsten, and copper powders, surfactants, processing aids, plasticizers, impact modifiers and toughening agents.

Compositions comprising oxa esters may be blended with any of the additional ingredients noted above, for example, to be used in a golf ball cover using any conventional blending technique. For example, the present compounds may be added to a vessel containing pelletized polymer resins and heated to 300 to 500° F. Thorough mixing of the materials is accomplished by means of a screw in the heated vessel.

Compositions comprising oxa esters can be used to form any type of golf ball. In particular, two-piece golf balls comprising a cover surrounding a core are within the scope of the present invention, as are wound golf balls, in which a fluid, semi-solid or solid core is surrounded by an elastic synthetic material. Any type of golf ball core can be used in the golf balls of the present invention. Preferred cores, however, include some amount of cis-polybutadiene. The subject polymers may also be used in golf balls having multiple covers and/or multiple cores.

Typically, the covers are formed around the solid or wound cores by either compression molding preformed half-shells of the cover stock material or by injection molding the cover stock about the core. Half-shells are made by injection molding a cover stock into a conventional half-shell mold in a conventional manner. The preferred method is compression molding of preformed half-shells.

The present invention can be used in forming golf balls of any desired size. While "The Rules of Golf" by the USGA dictates that the size of a competition golf ball be more than 1.680 inches in diameter, golf balls of any size can be used for leisure golf play. Therefore, while the preferred diameter of the golf balls is at least 1.680 inches to about 1.800 inches, golf balls of any size are within the scope of the present invention.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments that fall within the true spirit and scope of the present invention.

We claim:

1. A golf ball having at least one layer, wherein the layer is formed of a polymer blend comprising:
    at least one ionomer comprising at least one α-olefin and at least one α, β-unsaturated carboxylic acid, wherein at least a portion of the acid groups are neutralized with at least one metal atom; and
    at least one oxa ester.

2. The golf ball of claim 1, wherein the ionomer comprises about 16 percent to about 35 percent by weight of the at least one α, β-unsaturated carboxylic acid.

3. The golf ball of claim 1, wherein the golf ball has an Atti compression of at least 50 and a coefficient of restitution of at least 0.7.

4. The golf ball of claim 1, wherein the layer has a hardness of at least about 15 Shore A, a flexural modulus of at least about 500 psi, and a specific gravity of at least about 0.7.

5. The golf ball of claim 1, wherein the layer further comprises at least one density adjusting filler.

6. The golf ball of claim 5, wherein the density adjusting filler is a metallic powder, a metallic oxide derivative, or a combination thereof.

7. The golf ball of claim 6, wherein the density adjusting filler comprises titanium, tungsten, tin, copper, or a combination thereof.

8. The golf ball of claim 1, wherein the golf ball comprises a cover formed of a thermoplastic polyurethane, a thermoset polyurethane, a urethane ionomer, a urethane epoxy, or a combination thereof.

9. The golf ball of claim 8, wherein the cover is formed of a thermoplastic polyurethane, a thermoset polyurethane, or a combination thereof.

10. The golf ball of claim 9, wherein the cover has a hardness of about 40 Shore D to about 70 Shore D and a flexural modulus of about 10,000 psi to about 100,000 psi.

11. A golf ball having at least one layer, wherein the layer is formed of a polymer blend comprising:
    at least one acid-containing copolymer ionomer component comprising E/X/Y copolymers, wherein E is ethylene, X is a softening comonomer, and Y is acrylic or methacrylic acid, and
    at least one oxa ester.

12. The golf ball of claim 11, wherein the layer is disposed between a core and a cover.

13. The golf ball of claim 12, wherein the layer has a thickness of about 0.02 inches or greater.

14. The golf ball of claim 12, wherein the cover comprises a thermoplastic polyurethane, a thermoset polyurethane, or a combination thereof.

15. The golf ball of claim 12, wherein the cover has a hardness of about 40 Shore D to about 70 Shore D and a flexural modulus of about 10,000 psi to about 100,000 psi.

16. The golf ball of claim 11, wherein the layer further comprises at least one density adjusting filler.

17. The golf ball of claim 12, wherein the core comprises polybutadiene.

18. A golf ball having at least one layer, wherein the layer is formed of a polymer blend comprising:
    at least one saponified ionomer; and
    at least one oxa ester.

19. The golf ball of claim 18, wherein the layer is disposed between a core and a cover.

20. The golf ball of claim 19, wherein the cover comprises a thermoplastic polyurethane, a thermoset polyurethane, or a combination thereof.

21. The golf ball of claim 19, wherein the core comprises cis-polybutadiene.

22. The golf ball of claim 19, wherein the layer has a hardness of about 20 Shore D to about 70 Shore D.

* * * * *